(12) United States Patent
Wen et al.

(10) Patent No.: US 7,933,521 B2
(45) Date of Patent: Apr. 26, 2011

(54) INTEGRATED MULTIPLEXER/DEMULTIPLEXER HAVING OFFSET TRANSMITTERS AND RECEIVERS FOR USE IN AN OPTICAL TRANSCEIVER MODULE

(75) Inventors: Zhenli Wen, Shanghai (CN); Kevin Zhang, Fremont, CA (US); Dongsheng Han, Zhuhai (CN); Fahua Lan, Shanghai (CN)

(73) Assignee: Finisar Corporation, Sunnyvale, CA (US)

( * ) Notice: Subject to any disclaimer, the term of this patent is extended or adjusted under 35 U.S.C. 154(b) by 712 days.

(21) Appl. No.: 11/943,817

(22) Filed: Nov. 21, 2007

(65) Prior Publication Data

US 2008/0292317 A1 Nov. 27, 2008

Related U.S. Application Data

(60) Provisional application No. 60/866,744, filed on Nov. 21, 2006.

(51) Int. Cl.
*H04J 14/02* (2006.01)
*H04B 10/00* (2006.01)

(52) U.S. Cl. ............ 398/135; 398/91; 398/164
(58) Field of Classification Search ............ 398/82–86, 398/88, 91, 135, 164
See application file for complete search history.

(56) References Cited

U.S. PATENT DOCUMENTS

| | | | |
|---|---|---|---|
| 6,750,969 B2 * | 6/2004 | Richard et al. .............. 356/399 |
| 2002/0081073 A1 * | 6/2002 | Lee et al. ..................... 385/47 |
| 2003/0063844 A1 * | 4/2003 | Caracci et al. ............... 385/24 |
| 2003/0128917 A1 * | 7/2003 | Turpin et al. ................. 385/24 |

* cited by examiner

*Primary Examiner* — Dalzid Singh
(74) *Attorney, Agent, or Firm* — Maschoff Gilmore & Israelsen (57) ABSTRACT

An apparatus for use in an optical transceiver module that incorporates an integrated multiplexer/demultiplexer for high speed data transfer applications. One example embodiment includes a transmissive block arranged to interface with a transmit optical port, a receive optical port, and a plurality of optical subassemblies. The transmit optical port may transmit a first multiplexed optical signal and the receive optical port may receive a second multiplexed optical signal. Filters may be positioned between the transmissive block and one or more of the optical subassemblies to transmit signals at predetermined wavelengths while reflecting other signals incident thereon.

18 Claims, 6 Drawing Sheets

INTEGRATED MULTIPLEXER/DEMULTIPLEXER HAVING OFFSET TRANSMITTERS AND RECEIVERS FOR USE IN AN OPTICAL TRANSCEIVER MODULE

CROSS-REFERENCE TO RELATED APPLICATIONS

This application claims priority to U.S. Provisional Patent Application Ser. No. 60/866,744, filed on Nov. 21, 2006, which is incorporated herein by reference in its entirety.

BACKGROUND

1. Technology Field

The present invention generally relates to optical communication modules. In particular, the present invention relates to an integrated assembly for use in an optical transceiver module that incorporates an integrated multiplexer/demultiplexer for high speed data transfer applications. A unique laser and detector arrangement may enable the assembly's use in compact transceiver module form factors.

2. The Related Technology

While the use of light transmissive blocks in multiplexing or demultiplexing optical signals is generally known, such designs suffer from various limitations. For example, the size of the blocks is relatively large, making them too large to be used in some transceiver package form factors, such as Xenpak, X2, etc. Also, assemblies using such transmissive blocks typically have prevented a preferred alignment to be achieved, such as between transmit and receive ports of the transceiver, or between these ports and the optical transmitters or optical detectors that are optically coupled to the block. Such blocks also usually require an isolator to be coupled to each optical transmitter in the case of a multiplexer. Use of multiple isolators in this manner can increase the relative size, complexity, and cost of the device.

In addition, such transmissive blocks have typically been utilized for either multiplexing or demultiplexing optical signals in a device, but not for both operations. As such, two separate devices must often be included in a device, such as a communications module, to perform the requisite multiplexing and demultiplexing operations.

In light of this, a need exists in the art for a single device that can perform both multiplexing and demultiplexing operations in a communications module. Further, any such solution should permit its use within modules having prevalent form factors, such as Xenpak, X2, etc.

BRIEF SUMMARY

In general, embodiments of the invention are concerned with apparatuses for multiplexing and demultiplexing optical signals. While disclosed embodiments are described as having particular applicability for use in high data-rate applications of 100 G/s, it will be appreciated that the embodiments would have equal applicability in applications of other data rates as well.

One example embodiment of the present invention is directed to an integrated multiplexing and demultiplexing assembly that comprises a transmissive block and a plurality of optical transmitter and detector subassemblies each being arranged to interface with a transmit optical port and a receive optical port through the transmissive block. A first optical subassembly may be associated with a first wavelength, a second optical subassembly may be associated with a second wavelength, and so on.

A first filter may be positioned between the transmissive block and the first optical subassembly to transmit signals associated with the first wavelength while reflecting other signals incident thereon. Likewise, a second filter may be positioned between the transmissive block and the second optical subassembly to transmit signals associated with the second wavelength while reflecting other signals incident thereon. Thus, optical signals comprising multiple wavelengths may be multiplexed and transmitted to the transmit optical port. Similarly, optical signals comprising multiple wavelengths may be received from the receive optical port and demultiplexed.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SELECTED EMBODIMENTS

Reference will now be made to figures wherein like structures will be provided with like reference designations. It is understood that the drawings are diagrammatic and schematic representations of exemplary embodiments of the invention, and are not limiting of the present invention nor are they necessarily drawn to scale.

FIGS. 1-6 depict various features of embodiments of the present invention, which are generally directed to an integrated multiplexer ("mux")/demultiplexer ("demux") assembly for use in a communications module, such as an optical transceiver module. The integrated mux/demux assembly is a single device and as such can perform both the optical signal multiplexing and demultiplexing functions of the transceiver module, especially in high data-rate applications of 100 G/s. Further, the integrated mux/demux assembly is a compact solution that can be housed in various transceiver and device form factors, including Xenpak, X2, LX4, etc.

Figure 1A:
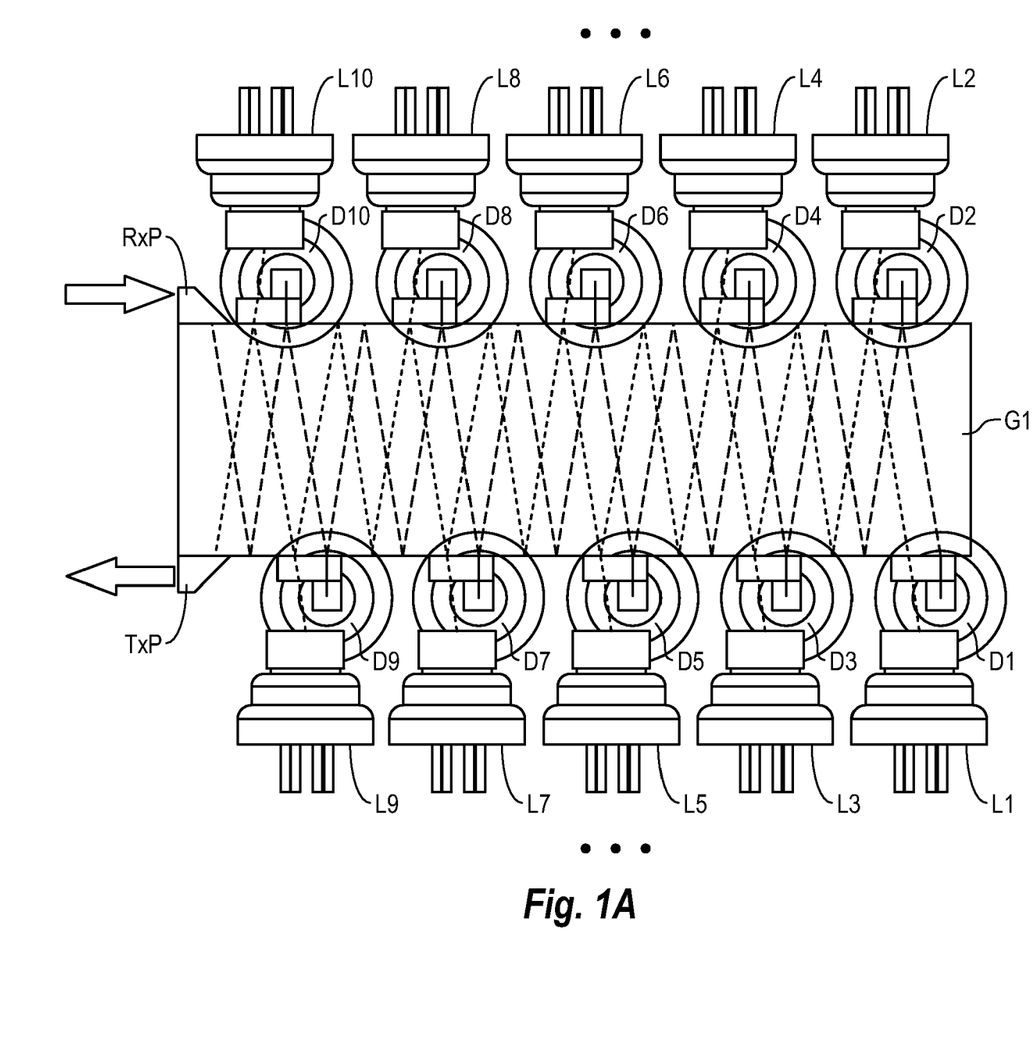
FIG. 1A is a simplified top view of an integrated mux/demux assembly configured in accordance with one embodiment.
Figure 1B:
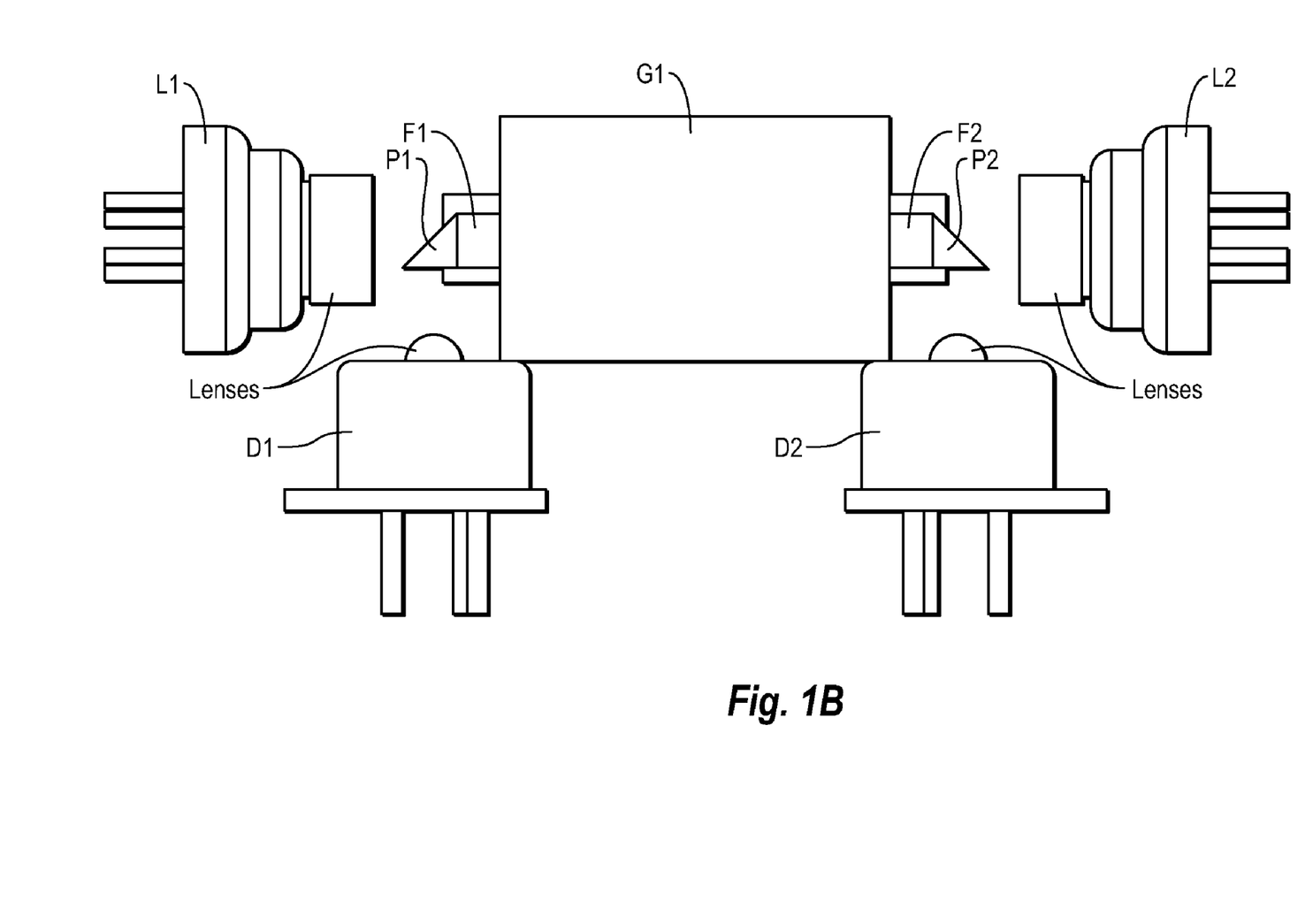
FIG. 1B is a simplified end view of the integrated mux/demux assembly of FIG. 1A.

Reference is first made to FIGS. 1A and 1B, which show an integrated mux/demux assembly ("assembly") in a simplified top view, according to one embodiment. The assembly may include 10 optical transmitters or lasers L1-L10. The lasers can be FP, DFB, or VCSEL laser type, or can be any other suitable light source. Each laser may include a lens suitably positioned adjacent thereto, as described further below. The lasers L1, L3, L5, L7, and L9 may be arranged laterally and in parallel along a first surface of an optically transmissive block G1, while the lasers L2, L4, L6, L8, and L10 may be arranged laterally and in parallel along a second surface of the transmissive block. So positioned, the lasers may be aligned along a common plane on either side of the transmissive block.

FIG. 1A also shows a set of optical receivers or detectors D1-D10, which can be PIN detectors, APDs, or other suitable photodetectors. Like their laser counterparts, each detector may include a lens suitably positioned adjacent thereto, as described further below. The detectors D1, D3, D5, D7, and D9 may be arranged vertically and in parallel along the first surface of the transmissive block G1, while the detectors D2, D4, D6, D8, and D10 may be arranged laterally and in parallel along the second surface of the transmissive block. Each detector D1-D10 may be positioned proximate its similarly numbered laser L1-L10 in a manner further described below. As shown in FIG. 1A, the above configuration results in 10 optical subassemblies, each comprising a laser/detector pair, arranged along the first and second surfaces of the transmissive block, with each detector being offset from its respective laser by an angle, e.g., approximately 90 degrees (best seen in FIG. 1B).

In the present embodiment shown in FIGS. 1A and 1B, each laser or detector may have an edge-to-edge spacing of approximately 0.5 mm or more to ensure sufficient mechanical stability. Also, a center-to-center distance between adjacent lasers or detectors may be at least 6.1 mm; in this embodiment the center-to-center spacing is approximately 6.54 mm. In this case, with five laser/detector pairs disposed on either side of the transmissive block, the required transmissive block length is at least 30.5 mm, approximately.

Ten filters F1-F10 may be included in the integrated assembly, one for each laser/detector pair (e.g., see filters F1 and F2 in FIG. 1B). In one embodiment, each filter is a thin film filter attached to the transmissive block G1 that is configured according to the particular wavelength emitted or absorbed by the respective laser and detector with which they are operably positioned. So configured, the particular thin film filter allows passage therethrough of the optical signal having a wavelength corresponding to the respective laser and detector to which it is operably connected while reflecting all other wavelengths.

Operably attached to each filter may be a reflective prism P1-P10 configured to redirect a received optical signal transmitted from the transmissive block G1 and through the filter to the respective detector of the laser/detector pair (e.g., see prisms P1 and P2 in FIG. 1B). Each detector and corresponding prism may be positioned slightly offset with respect to the laser in order to enable the transmit optical signal produced by each laser to enter the corresponding filter unimpeded. So configured, each filter and corresponding prism may form a filter/prism assembly. In one embodiment, each prism is attached to its respective filter by suitable adhesive having a similar index of refraction to the prism, filter and/or transmissive block.

As mentioned, the optical signal-transmissive block G1 is included as the core of the integrated assembly. The filter/prism assemblies may be operably connected at predetermined locations to the block G1 in order to transmit and pass optical signals to and from the block, as further described below.

Figure 5A:
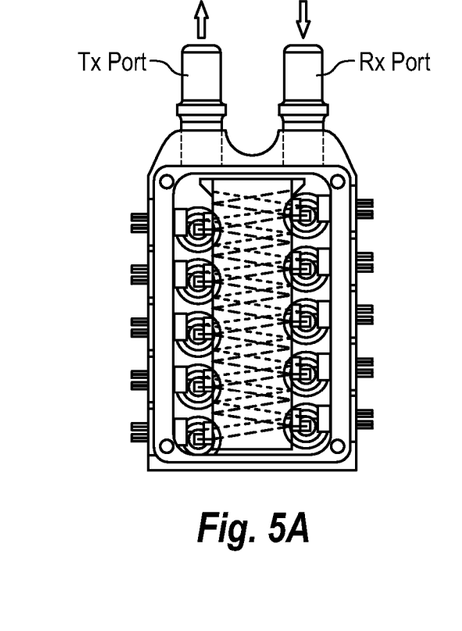
FIGS. 5A-5F show various views of an integrated mux/demux assembly housed in a housing in accordance with one embodiment.
Figure 5B:
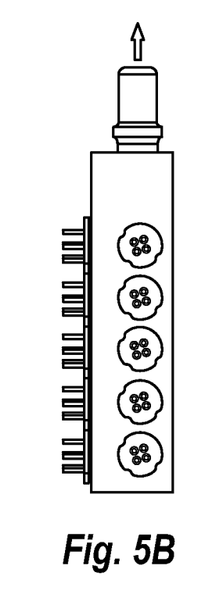
Figure 5C:
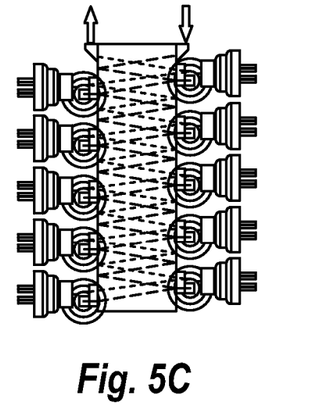
Figure 5D:
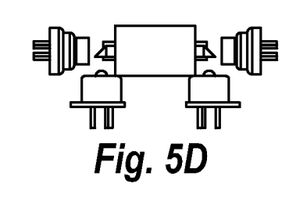
Figure 5E:
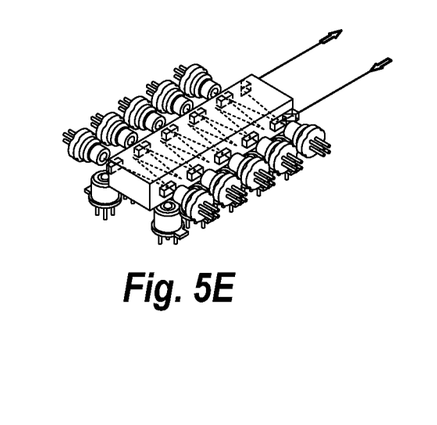
Figure 5F:
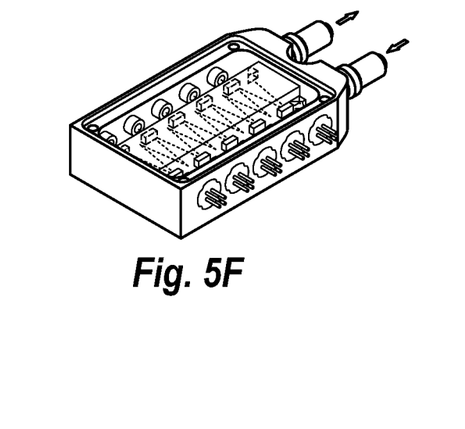
Figure 6A:
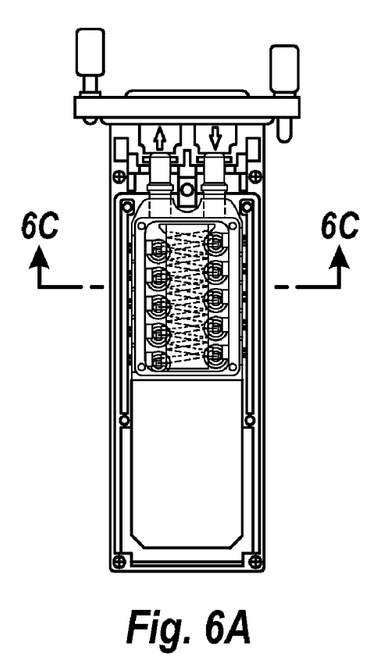
FIGS. 6A-6D show various views of a transceiver Xenpak package including one embodiment of the integrated mux/demux assembly in accordance with one embodiment.
Figure 6B:
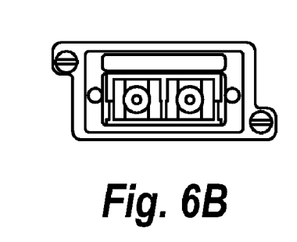
Figure 6C:
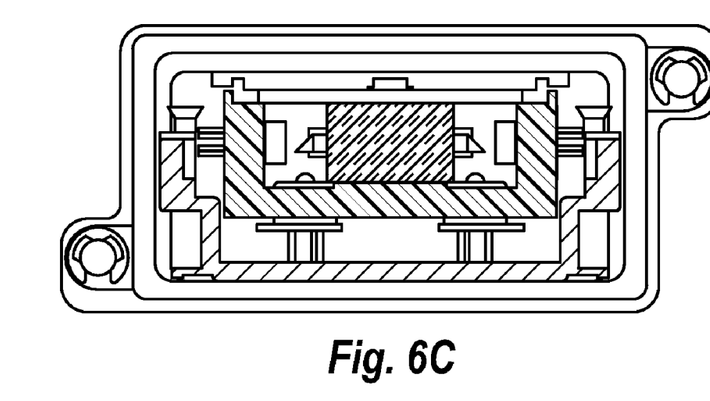
Figure 6D:
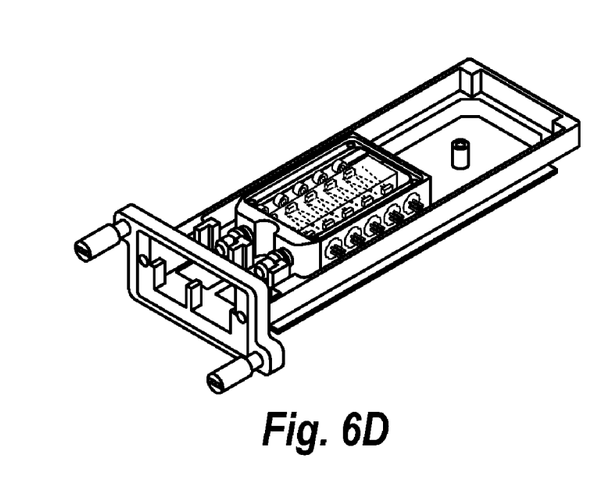

Two master prisms, transmitter port prism TxP and receiver port prism RxP, may also be positioned with respect to and operably connected with the transmissive block G1 in order to redirect multiplexed optical signals from the block into a respective transmitter port TX (FIG. 5A) or to the block from receiver port RX (FIG. 5A). Each of the TX port and the RX port can include a lens as needed, and the TX port may include a free space, dual stage isolator.

A high reflection coating R may be applied to the surfaces of the block G1 where reflection of optical signals within the block is desired, namely, between the locations of the filters. Note that no reflective coating is applied at the points of operable attachment of the filters and the master prisms TxP, RxP to the block G1.

As described, the integrated assembly shown in FIGS. 1A-1B and described above simultaneously mutliplexes and demultiplexes optical signals as a single device. Multiplexing of optical signals by the integrated assembly proceeds in one embodiment as follows: laser L1 emits a beam having a wavelength $\lambda_1$, which passes through the attached lens and filter. As described, the filter for laser L1 is configured so as to allow passage of the beam of laser L1 having wavelength $\lambda_1$.

After passage through the filter F1, the beam from laser L1 enters the block G1 and is then repeatedly reflected in a crisscross path along a reflective "transmit path" through the block by a selected combination of the reflective coatings R, filters, and prism TxP until its entry into the TX port. Specifically, the trace of this beam is: F1, F2, R1-3, R2-4, F3, F4, R3-5, R4-6, F5, F6, R5-7, R6-8, F7, F8, R7-9, R8-10, F9, F10, TxP, and TX port, wherein the numbers following the filter "F" designations indicate the laser/detector pair to which the filter is operably associated, and wherein the hyphenated numbers following the reflective coating designations indicate the portion of the reflective coating that is between the laser/detector pairs having those number designations.

Correspondingly, Laser L2 emits a beam having wavelength $\lambda_2$, which passes through the attached lens and filter F2. As described, filter F2 is configured so as to allow passage of the beam of laser L2 while reflecting all other incident beams having other wavelengths. After passage through the filter F2, the beam from laser L2 enters the block G1 and is then repeatedly reflected in a criss-cross path through the block by a selected combination of the reflective coatings R, filters F, and prism TxP until its entry into the TX port. Specifically, the trace of this beam is: F2, R1-3, R2-4, F3, F4, R3-5, R4-6, F5, F6, R5-7, R6-8, F7, F8, R7-9, R8-10, F9, F10, TxP, and TX port.

Laser L3 emits a beam having wavelength $\lambda_3$, which passes through the attached lens and filter F3. As described, filter F3 is configured so as to allow passage of the beam of laser L3 while reflecting all other incident beams having other wavelengths. After passage through the filter F3, the beam from laser L3 enters the block G1 and is then repeatedly reflected in a criss-cross path through the block by a selected combination of the reflective coatings R, filters F, and prism TxP until its entry into the TX port. Specifically, the trace of this beam is: F3, F4, R3-5, R4-6, F5, F6, R5-7, R6-8, F7, F8, R7-9, R8-10, F9, F10, TxP, and TX port.

Laser L4 emits a beam having wavelength $\lambda_4$, which passes through the attached lens and filter F4. As described, filter F4 is configured so as to allow passage of the beam of laser L4 while reflecting all other incident beams having other wavelengths. After passage through the filter F4, the beam from laser L4 enters and traverses the width of the block G1 and passes through prism TxP for its entry into the TX port. Specifically, the trace of this beam is: F4, R3-5, R4-6, F5, F6, R5-7, R6-8, F7, F8, R7-9, R8-10, F9, F10, TxP, and TX port.

In analogous manner, the beams of specified wavelength that are emitted by the lasers L5-L10 follow along the corresponding portions of the reflective transmit path, which path is completely described by the path of the laser beam from L1, detailed above, until arrival at the master prism TxP, where they are passed into the TX port for transmission via an optical fiber (not shown) that is operably connected to the port. In this manner, the beams from each of the lasers L1-L10 are combined via their introduction to the common reflective transmit path, resulting in a multiplexed optical signal that is transmitted from the TX port to the optical fiber.

The integrated assembly, as a single device, may also demultiplex incoming multiplexed optical signals that are received via the RX port. Demultiplexing of multiplexed optical signals may proceed in one embodiment as follows: a multiplexed optical signal containing wavelengths $\lambda_1, \lambda_2, \lambda_3, \lambda_4, \ldots, \lambda_{10}$ is received through the RX port from an optical fiber (not shown) connected thereto. The multiplexed optical signal is reflected by prism RxP and into the transmissive block G1.

The optical signal having wavelength $\lambda_{10}$ may be transmitted in crisscross fashion across the block G1 along a portion of a reflective "receive path" and to the filter F10 corresponding to the laser/detector pair 10. The filter F10 may be configured so as to allow passage of the beam having wavelength $\lambda_{10}$ while reflecting all other incident beams having other wavelengths. Thus the optical signal having wavelength $\lambda_{10}$ may passthrough the filter F10, while the remainder of the multiplexed optical signal containing the wavelengths $\lambda_{1-9}$ may continue along the received path. After passage through the filter F10, the optical signal is redirected toward the detector D10 by the prism attached to filter F10 and is then is received by detector D10.

The multiplexed signal having remaining wavelengths $\lambda_{1-9}$ may continue along the crisscross reflective receive path through the block G1, as shown in FIG. 1A, until arriving at the filter F9 corresponding to the laser/detector pair 9. The filter F9 may be configured so as to allow passage of the beam having wavelength $\lambda_9$ while reflecting all other incident beams having other wavelengths. Thus the optical signal having wavelength $\lambda_9$ may pass through the filter F9, while the remainder of the multiplexed optical signal containing the wavelengths $\lambda_{1-8}$ may continue along the received path. After passage through the filter F9, the optical signal may be redirected toward the detector D9 by the prism attached to filter F9 and may then be received by detector D9.

The multiplexed signal having remaining wavelengths $\lambda_{1-8}$ may continue along the criss-cross reflective receive path through the block G1 until each optical signal component having a particular wavelength is transmitted through a corresponding one of the filters F5-F7, redirected by the accompanying prism, and received by the corresponding detector D1-D8. Thus each optical signal having one of the predetermined wavelengths $\lambda_{1-8}$ is separated, or demultiplexed, from the multiplexed optical signal. Accordingly, the trace of the last optical signal to be demultiplexed, wavelength $\lambda_1$, is as follows: RxP, R9, F10, F9, R8-10, R7-9, F8, F7, R6-8, R5-7, F6, F5, R4-6, R3-5, F4, F3, R2-4, R1-3, F2, F1. In this manner, all wavelengths of the multiplexed optical signal may be acceptably received into the corresponding detectors.

Note that the present design enables the TX and RX port (FIG. 5A) to be positioned in parallel relation to one another. Further, the current design enables the lasers and detectors to be positioned perpendicular to the TX and RX ports. Thus, as shown in FIG. 5A, multiplexed optical signal paths defined between the transmissive block G1 and the TX and RX ports may be substantially parallel with the lateral surfaces of the transmissive block G1 along which the lasers and detectors are positioned. This feature facilitates use of the integrated assembly within transceiver packages having established form factors. It is also noted that the present design may be designed for acceptable operation in environments having industrial temperature ranges (−40 to 85 degrees).

The design described above in connection with FIGS. 1A, 1B may involve only one isolator included in the TX port, in contrast with previous designs, which typically use one isolator for each laser device. The use of only one dual-stage, free space isolator equates to lower assembly cost and may be possible where: 1) the optical signals produced by the lasers L1-L10 are polarized; and 2) the wavelength interval of the optical signals produced by the lasers L1-L10 is relatively small.

Figure 2A:
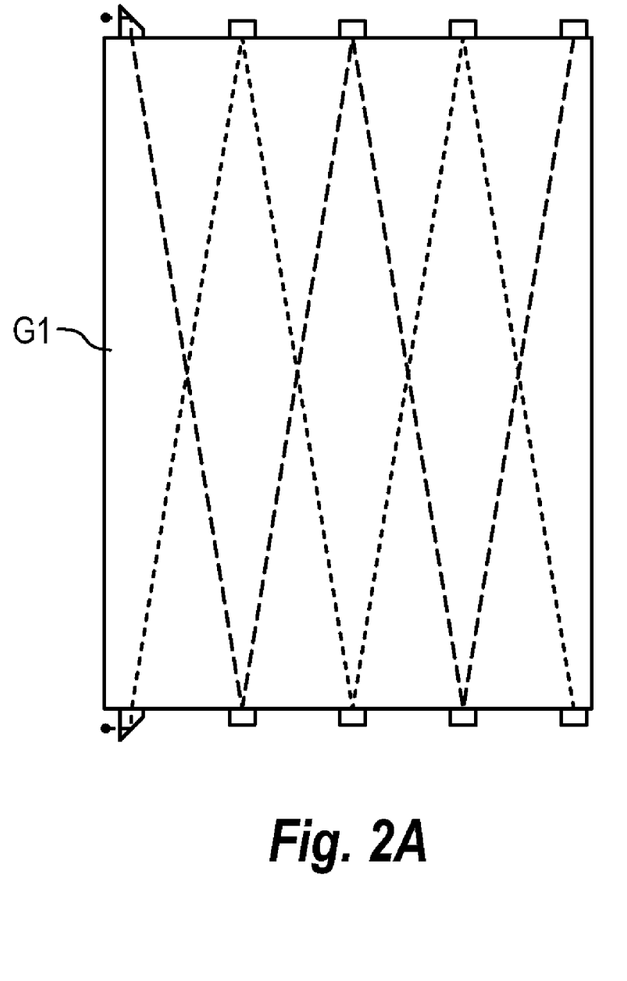
FIGS. 2A-2B are simplified views of the transmissive block according to two possible embodiments.
Figure 2B:
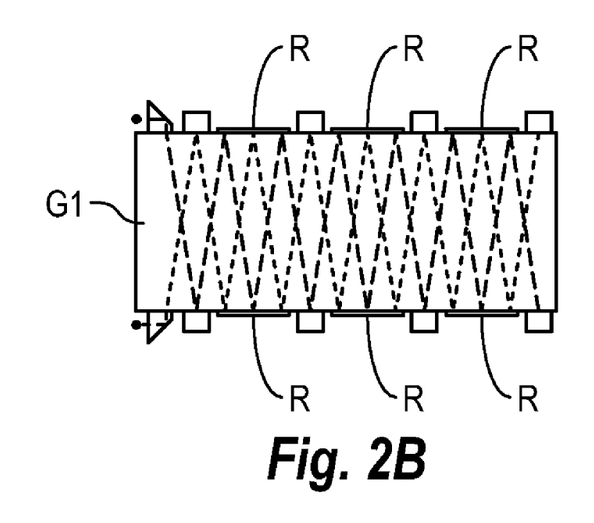

Together with FIGS. 1A and 1B, reference is now made to FIGS. 2A-2B, which compares a transmissive block having reflective coatings, such as the block G1 of the integrated assembly of FIGS. 1A-1B, to a block without the reflective coatings. As can be seen, the reflective coatings R in FIG. 2B enable the same center-to-center distance between filters, which correspond with the laser-to-laser or detector-to-detector spacing to be achieved in the small block as in the larger block by virtue of the total internal reflection of optical signals within the small block. In one embodiment the smaller block in FIG. 2B is about four times smaller than the comparable block in FIG. 2A. Notwithstanding the small size of the transmissive block, however, suitable separation distances between the lasers and detectors are still achieved such that adjacent lasers or adjacent detectors are not in physical or overlapping contact with one another. In one embodiment the transmissive block G1 is composed of fused silica, though other suitable compositions can also be used. Fused silica desirably has a small coefficient of thermal expansion (C.T.E.). Note also that the transmissive block provides ample surface area for bonding with a housing (see FIGS. 5A-5F) in which the integrated assembly is housed. Thus, the smaller block represents two distinct advantages in that it allows for adequate spacing between the lasers and detectors while maintaining a relatively small size. However, though the smaller transmissive block may be desired in certain applications, either block can be employed in embodiments of the present invention.

The two sides on the small block of FIG. 2B may be configured to be parallel within about 2 microns tolerance. In one embodiment wherein the total light path distance from laser to TX port is approximately 100 mm, a tolerance of about 2 microns is readily achievable. Further, it is noted that the transmissive block of the present invention may be designed to exhibit good temperature and mechanical stability.

The reflective coatings R in one embodiment are composed of Ta2O5 and SiO2. Other embodiments can use other acceptable coating materials, including metallic and broadband dielectric coatings.

With respect to the optical signal passage through the filters F1-F10 and the transmissive block G1, note that the angle of incidence of the filters is approximately 13.5 degrees on the air side and approximately 9.3 degrees on the transmissive block side, owing to the respective differences in index of refraction. Such filters are commercially available, which further facilitates a lower production cost for the integrated assembly. Of course, the filter and/or block can be modified to produce different angles of incidence, if needed or desired for a particular application.

Figure 3:
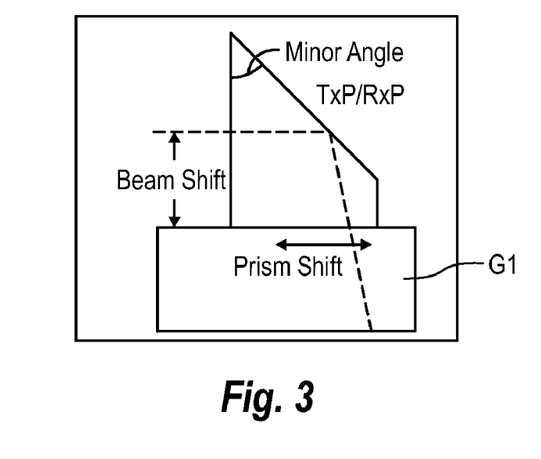
FIG. 3 is a simplified view of the interaction of a prism of the assembly of FIG. 1A with the transmissive block.

FIG. 3 illustrates that the position of the transmitter port prism TxP or receiver port prism RxP can be adjusted with respect to the block G1 in order to direct the optical beam either to or from the TX port/RX port accurately. In one embodiment the prisms TxP and RxP are composed of fused silica and have a minor angle of 49.6 degrees, +/−0.1 degree. The prisms TxP and RxP may be bonded to the surface of the block G1 by an epoxy or other suitable adhesive having an index of refraction sufficiently close to that of the composition of the prism and/or the block.

Figure 4:
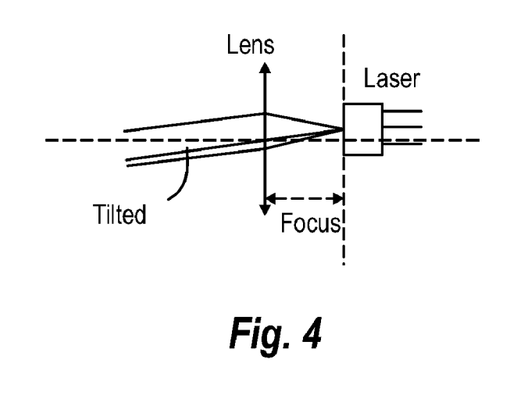
FIG. 4 is a simplified block view of a laser and lens configuration of the assembly of FIG. 1A, according to one embodiment.

FIG. 4 graphically describes the respective positioning of the laser and lens of the lasers L1-L10 in order to produce an optical signal that propagates at an angled direction of travel with respect to the emitting surface of the laser. In this configuration, the emission point of the laser is positioned at the focal point of the lens but off-center with respect to the central axis of the lens, thereby producing the angled beam propagation. This configuration can also be employed in the respective positioning of the lenses included with the detectors D1-D10.

It is noted that, because each laser in the illustrated embodiment produces a relatively small beam spot of approximately 3 microns, and thereby will produce a relatively large divergent angle, the focal length of the lens should also be small, such as approximately 0.8-1 mm, in order to produce a suitably sized and collimated beam. In the present embodiment, each laser and lens may be positioned so as to produce a beam having a tilted angle of approximately 13.5 degrees, equal to the angle of incidence of the air side of the filters F1-F10. For each detector D1-D10, the focal length can be about 2 mm, owing to the relatively larger size of the sensitive area of the detector, about 40 microns. Note that the lens type can be any suitable type, including A or D-lenses, a Grin lens or ball lens.

FIGS. 5A-5F show various views of a housing in which the integrated assembly of FIGS. 1A-1B can be housed, according to one embodiment. Also shown with the housing are the TX and RX ports through which the multiplexed optical signals pass during transceiver operation.

FIGS. 6A-6D show various views of a Xenpak transceiver package into which the housed integrated assembly of FIGS. 5A-5F can be received. As mentioned, the integrated assembly can also be included in transceiver packages having a variety of form factors as well, including LX4, X2, etc. Again, because of its relatively small displacement, the integrated assembly can be fit into module form factors that cannot house other multiplexer and demultiplexer solutions. This is due in part to the combined mux/demux functionality of the integrated assembly.

Thus, the structure and design of the integrated mux/demux assembly described herein offers several advantages, including small size due to the unique arrangement of the glass block, integration of both mux and demux functionality in a single component, lower cost and device complexity via reduction of part count, and preferred orientation and arrangement of device components, including the TX port, RX port, lasers, and detectors.

In one embodiment, each laser of the integrated assembly is a 10 Gb/s laser. When multiplexed in the manner described above, the multiplexed optical signal output therefore represents a 100 Gb/s data stream. Similarly, the detectors of the integrated assembly are capable of receiving and processing a 100 Gb/s incoming optical signal, wherein each detector receives and processes a 10 Gb/s optical signal. Of course, in other embodiments the composite data rate of the integrated assembly can be altered by choosing individual lasers having data rates greater or lower than 10 Gb/s. In addition, it is also possible in other embodiments to vary the total number of lasers and detectors from the ten of each shown in the accompanying drawings in order to produce a different composite data rate capacity. In yet another embodiment, it is possible to have a number of lasers that is different than the number of detectors in the integrated assembly. The above modifications in the total number of lasers and detectors would, of course, alter the overall size of the integrated assembly.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An integrated multiplexing and demultiplexing assembly, comprising:
   a transmissive block;
   a first optical subassembly associated with a first wavelength and arranged to interface with a plurality of external ports through the transmissive block;
   a second optical subassembly associated with a second wavelength and arranged to interface with a plurality of external ports through the transmissive block;
   a first filter positioned between the transmissive block and the first optical subassembly and configured to transmit signals associated with the first wavelength while reflecting other signals incident thereon; and
   a second filter positioned between the transmissive block and the second optical subassembly and configured to transmit signals associated with the second wavelength while reflecting other signals incident thereon, wherein the plurality of external ports includes a transmitter port adapted to transmit a first multiplexed optical signal and a receiver port adapted to receive a second multiplexed optical signal and each of the first and second optical subassemblies includes a transmitter and a detector,
   the first multiplexed optical signal being comprised of optical signals received from the transmitters of each optical subassembly along a reflective transmit path defined in the transmissive block, and
   the second multiplexed optical signal being comprised of optical signals transmitted to the detectors of each optical subassembly along a reflective receive path defined in the transmissive block.

2. The assembly of claim 1, wherein the assembly fits in at least one of a Xenpak, an X2, and an LX4 form factor.

3. The assembly of claim 1, wherein at least one of the first and second multiplexed optical signals represent a 100 Gb/s data stream.

4. The assembly of claim 1, wherein the transmitter port includes an isolator.

5. The assembly of claim 1,
wherein the transmitters of the first and second optical subassemblies are adapted to produce transmit signals at the first and second wavelengths, respectively, and
wherein the detectors of the first and second optical subassemblies are adapted to detect signals at the first and second wavelengths, respectively.

6. The assembly of claim 1,
further comprising a prism attached to each of the first and second filters,
wherein each optical subassembly's detector is positioned at an angle with respect to the optical subassembly's transmitter and each optical subassembly's prism is positioned so as to redirect optical signals received through the transmissive block to the optical subassembly's detector.

7. The assembly of claim 6,
wherein the angle is substantially a right angle.

8. The assembly of claim 6,
wherein each optical subassembly's prism is positioned outside an optical path defined between the optical subassembly's transmitter and the transmissive block.

9. The assembly of claim 6,
wherein the first optical subassembly is positioned along a first lateral surface of the transmissive block and the second optical subassembly is positioned along a second lateral surface of the transmissive block substantially parallel to the first lateral surface.

10. The assembly of claim 9,
wherein a multiplexed optical signal path defined between the transmissive block and at least one of the external ports is substantially parallel with the first and second lateral surfaces.

11. The assembly of claim 9, further including:
a third optical subassembly associated with a third wavelength and positioned along the first lateral surface proximate to the first optical subassembly;
a third filter positioned between the transmissive block and the third optical subassembly and configured to transmit signals associated with the third wavelength while reflecting other signals incident thereon;
a fourth optical subassembly associated with a fourth wavelength and positioned along the second lateral surface proximate to the second optical subassembly; and
a fourth filter positioned between the transmissive block and the fourth optical subassembly and configured to transmit signals associated with the fourth wavelength while reflecting other signals incident thereon.

12. The assembly of claim 11,
wherein the first and second lateral surfaces are selectively coated with a reflective coating to reflect all signals incident thereon, the filters being attached to portions of the first or second lateral surfaces where no reflective coating is present.

13. The assembly of claim 1,
wherein the first optical subassembly is positioned along a first lateral surface of the transmissive block and the second optical subassembly is positioned along a second lateral surface of the transmissive block substantially parallel to the first lateral surface.

14. The assembly of claim 13,
wherein a multiplexed optical signal path defined between the transmissive block and at least one of the external ports is substantially parallel with the first and second lateral surfaces.

15. The assembly of claim 13, further including:
a third optical subassembly associated with a third wavelength and positioned along the first lateral surface proximate to the first optical subassembly;
a third filter positioned between the transmissive block and the third optical subassembly and configured to transmit signals associated with the third wavelength while reflecting other signals incident thereon;
a fourth optical subassembly associated with a fourth wavelength and positioned along the second lateral surface proximate to the second optical subassembly; and
a fourth filter positioned between the transmissive block and the fourth optical subassembly and configured to transmit signals associated with the fourth wavelength while reflecting other signals incident thereon.

16. The assembly of claim 15,
wherein the first and second lateral surfaces are selectively coated with a reflective coating to reflect all signals incident thereon, the filters being attached to portions of the first or second lateral surfaces where no reflective coating is present.

17. An integrated multiplexing and demultiplexing assembly, comprising:
a transmissive block;
a first optical subassembly associated with a first wavelength and arranged to interface with a plurality of external ports through the transmissive block;
a second optical subassembly associated with a second wavelength and arranged to interface with a plurality of external ports through the transmissive block;
a first filter positioned between the transmissive block and the first optical subassembly and configured to transmit signals associated with the first wavelength while reflecting other signals incident thereon;
a second filter positioned between the transmissive block and the second optical subassembly and configured to transmit signals associated with the second wavelength while reflecting other signals incident thereon, wherein the plurality of external ports includes a transmitter port adapted to transmit a first multiplexed optical signal and a receiver port adapted to receive a second multiplexed optical signal;
a transmitter port prism attached to the transmissive block so as to redirect the first multiplexed optical signal from the transmissive block into the transmitter port; and
a receiver port prism attached to the transmissive block so as to redirect the second multiplexed optical signal from the receiver port into the transmissive block.

18. An integrated multiplexing and demultiplexing assembly, comprising:
a transmissive block having substantially parallel first and second lateral surfaces that are selectively coated with a reflective coating;
a transmitter port prism attached to a portion of the first lateral surface and in communication with a reflective transmit path defined in the transmissive block so as to redirect a first multiplexed optical signal from the reflective transmit path into a first external port;
a receiver port prism attached to a portion of the second lateral surface and in communication with a reflective receive path defined in the transmissive block so as to redirect a second multiplexed optical signal from a second external port into the reflective receive path; and
a plurality of optical subassemblies positioned adjacent one another along the first and second lateral surfaces, each subassembly including:

an optical transmitter adapted to produce a transmit optical signal of the first multiplexed optical signal, the transmit optical signal having a predetermined wavelength;

an optical detector positioned at a substantially right angle with respect to the optical transmitter and configured to detect a received optical signal of the second multiplexed optical signal, the received optical signal having a predetermined wavelength substantially the same as that of the transmit optical signal;

a filter positioned to enable passage of the transmit and received optical signals while reflecting other optical signal incident thereon, the filter being in communication with the reflective transmit and receive paths and attached to a portion of the first or second lateral surface where no reflective coating is present; and a prism attached to the filter and positioned so as to redirect the received optical signal from the filter after passage therethrough to the optical receiver.

* * * * *